Oct. 19, 1965    M. G. HARWOOD ETAL    3,212,475
POULTRY BLINDER WITH IMPROVED FASTENER
Filed Nov. 18, 1963

MILTON GENE HARWOOD
LOUIS JAY HARWOOD
INVENTORS.

BY Harry Ernest Rubens
ATTORNEY 3,212,475
POULTRY BLINDER WITH IMPROVED
FASTENER
Milton Gene Harwood and Louis Jay Harwood, both of
P.O. Box 38, Farmingdale, N.J.
Filed Nov. 18, 1963, Ser. No. 324,467
1 Claim. (Cl. 119—97)

Our invention relates to blinders and fasteners for use on the beaks of poultry, and more particularly to an easily flexed, self restoring self locking blinder, and is an improvement of the type shown in our U.S. Patent No. 3,066,651.

Blinders are conventionally employed on the beaks of poultry to reduce figthing between birds.

Wire mesh is used to contain poultry, and sooner or later the birds thrust their heads through the mesh, catching the poultry blinders on the wire. It the blinders are not immediately freed, the birds become frantic and violently tug at the mesh causing considerable injury to their beaks.

Accordingly in our earlier patent, we provided for a self locking poultry blinder which possessed sufficient flexure to permit withdrawal of the caught blinder from a wire mesh, and which would recover its original shape when released. We later found however, that the fastener, when made of plastic, lost its stiffness in warm areas of the country, making insertion of the fastener extremely difficult.

The object of the present invention is to provide a fastener for the improved self locking, and self restoring poultry blinder which will provide the necessary stiffness during the installation, while retaining the necessary flexure required during use.

Other objects are to provide the added stiffness required without adding to the cost of the fastener, which would permit manufacture by molding; and which would not cause any further discomfort to the poultry.

We accomplish these and other objects and obtain our new results as will be apparent from the device described in the following specification, particularly pointed out in the claim, and illustrated in the accompanying drawing in which:

Figure 1:
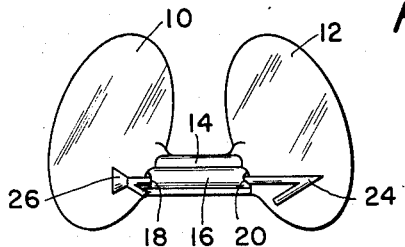
FIGURE 1 is a front elevation of our poultry blinder with an improved fastener attached thereto.
Figure 4:
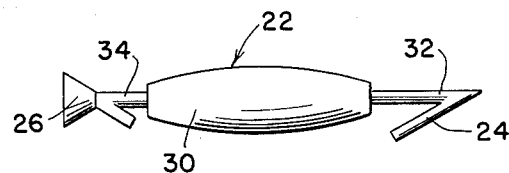
FIGURE 4 is a side elevation of the fastener.
Figure 2:
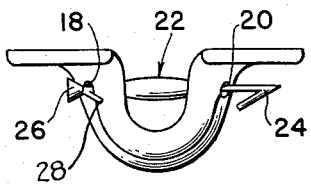
FIGURE 2 is a top plan view of the blinder and fastener.

Our poultry blinder is preferably made of flexible plastic material such as polyethylene or nylon. A blinder of this material can be easily flexed when it is pulled against a wire mesh. It is molded in the form shown, with two flat plate portions 10 and 12, connected by a bridge portion 14.

The bridge portion is curved to permit resting on the top of the beak. An outwardly extending ridge or positioning means 16 may be formed peripherally around the bridge to strengthen it without materially adding to its weight. The bridge further facilitates the flexure of the plate portions.

Two apertures 18 and 20 are formed in the blinder, adjacent the flt plate portions to permit entrance of a fastener 22 therethrough. The apertures are formed so that they axially align themselves with the nostrils in the poultry beak, when the blinder is in position.

The fastener is self locking. This is accomplished by forming the fastener 22 of springy material preferably of plastic such as nylon, with at least one outwardly and rearwardly extending flexible leg catch 24 or other suitable conventional catch which can be depressed into alignment with the fastener body for entrance through the apertures and nostrils. When the pressure is released on the leg, it automatically springs outwardly preventing removal until depressed back into alignment.

The other end of the fastener is preferably provided with a head 26, which may be pushed to force the fastener through the membrane between the nostril openings in the poultry. A small outwardly extending prong 28 may be employed to act as a stop on the head during installation.

Attempts to increase the stiffness of the plastic by a change in material resulted in a loss of the necessary flexibility required to allow the caught blinder to be released from a wire mesh by the bird.

Figure 3:
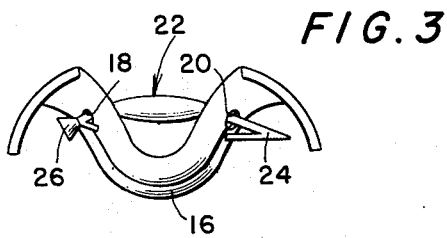
FIGURE 3 is a top plan view showing the poultry blinder and fastener of FIGURE 2 in flexed position.

We have discovered that we can increase the thickness of the central position 30 of the fastener, while retaining the smaller cross-section in the end areas 32 and 34 located at the region where they extend through the openings 18 and 20 of the bridge portion, to permit the necessary flexure, as shown in FIG. 3, when required. Any form of taper from the thickened center to the smaller end areas, may be used.

The cross-section of the elongated central portion 30, thus thickened, will permit the fasteners even when heated to the temperatures encountered in the warm arid regions, to retain sufficient stiffness to permit the fastener to be easily forced through the nostrils of poultry and through the membrane wall therebetween.

Such extra thickness does not interfere with the breathing of the poultry. For example, whereas the central diameter of the fastener body in our earlier patent was about .070", the present diameter need be only .085" to obtain the necessary added stiffness for hot weather use.

The two ends of the fastener freely extend through the openings of the bridge for a sufficient distance to allow the blinder to be adequately flexed without loss of position. The fastener is stiffly flexible plastic at the central portion and less stiff at the end portions to permit flexing without loss of the self locking feature even in hot weather. The flexible material of the blinder assists in the snap retaining action during the insertion of the fastener.

The fastener is first inserted into one aperture of the blinder, and then forced entirely through the nostril openings, nostril membrane therebetween and finally through the remaining blinder aperture, capturing the blinder in position on the beak with the flat plates upright in front of the eyes of the bird preventing forward vision.

It has been found that the bird easily trains itself to eat and drink freely despite the presence of the blinders.

FIGURE 3 illustrates the flexed position of the blinder and fastener when the bird attempts to withdraw its head. The wire easily slides off the blinder without damage to the beak. The flexible feature also protects the chicken from injury if it deliberately attempts to remove the blinder.

We have thus described our invention, but we desire it understood that it is not confined to the particular forms shown and described, the same being merely illustrative, and that the invention may be carried out in other ways without departing from the spirit of our invention, and therefore we claim broadly the right to employ all equivalent instrumentalities coming within the scope of the appended claim, and by means of which objects of our invention are obtained and new results accomplished since the particular embodiments herein shown and described are only some of the many that can be employed to obtain these objects and accomplish these results.

We claim:

A poultry blinder having a pair of plate-like portions to cover the eyes of poultry, and a positioning means including a pointed fastener extending through the positioning means, and having a catch portion at each end thereof to support the plate-like portions on the beak of poultry, said fastener and blinder being made of easily flexed material capable of flexing when the plate-like portions are caught in a wire mesh, and of self return thereafter to their original position, to bring the plate-like portions to the front of the eyes of the poultry, said fastener further characterized by a thickened elongated central portion centrally located relative to the beak when installed for increasing the stiffness of the central portion sufficiently to permit the fastener to be forced through the nostrils of poultry at high ambient temperatures said thickened central portion being reduced towards each end thereof from a maximum thickness at the center thereof.

References Cited by the Examiner
UNITED STATES PATENTS

| | | | |
|---|---|---|---|
| 2,718,212 | 9/55 | Bartner | 119—97 |
| 3,066,651 | 12/62 | Harwood et al. | 119—97 |

SAMUEL KOREN, *Primary Examiner.*

ALDRICH F. MEDBERY, *Examiner.*